United States Patent [19]
Amey

[11] Patent Number: 6,057,420
[45] Date of Patent: May 2, 2000

[54] PROCESS FOR THE MANUFACTURE OF AN AQUEOUS SOLUTION OF POLYAMIDE-EPICHLOROHYDRIN RESIN HAVING LOW LEVELS OF FREE EPICHLOROHYDRIN AND RELATED HYDROLYSIS PRODUCTS

[75] Inventor: Ronald Lee Amey, Wilmington, Del.

[73] Assignee: E. I. du Pont de Nemours and Company, Wilmington, Del.

[21] Appl. No.: 08/183,273

[22] Filed: Jan. 19, 1994

Related U.S. Application Data

[62] Division of application No. 07/868,321, Apr. 14, 1992.

[51] Int. Cl.$^7$ ...................................................... B01J 39/04
[52] U.S. Cl. ........................ 528/482; 528/405; 162/164.3; 162/164.6; 210/691; 210/692
[58] Field of Search .............................. 162/164.3, 164.6; 210/660, 908, 691, 692; 528/482, 405

[56] References Cited

U.S. PATENT DOCUMENTS

| | | | |
|---|---|---|---|
| 2,601,597 | 6/1952 | Daniel et al. | 162/164.3 |
| 3,640,909 | 2/1972 | Jones et al. | 162/164.3 |
| 3,655,506 | 4/1972 | Baggett | 162/164.3 |
| 3,804,789 | 4/1974 | Chamberlin | 162/164.3 |
| 5,189,142 | 2/1993 | Devore et al. | 528/339.3 |

*Primary Examiner*—Peter Chin

[57] ABSTRACT

A process for lowering the amount of epichlorohydrin and related hydrolysis compounds contained in paper strength enhancing resins by treating an aqueous solution of the resin with an adsorbent.

1 Claim, No Drawings

PROCESS FOR THE MANUFACTURE OF AN AQUEOUS SOLUTION OF POLYAMIDE-EPICHLOROHYDRIN RESIN HAVING LOW LEVELS OF FREE EPICHLOROHYDRIN AND RELATED HYDROLYSIS PRODUCTS

This is a division of application Ser. No. 07/868,321, filed Apr. 14, 1992.

FIELD OF THE INVENTION

This invention relates to the manufacture of an aqueous solution of polyamide-epichlorohydrin resin having low levels of epichlorohydrin and related hydrolysis products, and to paper treated with such solutions. Paper so treated has improved wet and dry strength over paper that has been treated with polyamide-epichlorohydrin resin solutions that have higher amounts of free epiclilorohydrin and related hydrolysis products. Furthermore, the paper product treated with aqueous solutions having low levels of free epiclhlorolhydrin and related hydrolysis products contains smaller amounts of these chemicals that are suspected of being carcinogens and are environmental pollutants.

BACKGROUND OF THE INVENTION

Paper strengthening resins are sold commercially as aqueous solutions. Commonly such resins are thermosetting, polymeric reaction products of epichlorohydrin and a polyamide derived from a polyalkylene polyamide and certain dicarboxylic acids. U.S. Pat. No. 2,926,154 to Keim describes aqueous solutions of such resins. Typically aqueous solution of such resins contain an amine curing accelerator such as ethyienediamine or diethylenetriamine. Such compositions are disclosed in Espy U.S. Pat. No. 3,442,754. The presence of the accelerator makes it possible to thermally set the resin in a shorter time.

Commercially such aqueous solution usually contain about 10 to 35% by weight resin. Most of the remaining portion of the solution is water.

Such commercial aqueous solutions typically contain epiclilorohydrini, dichloropropanol and cliloropropanediol; the latter two compounds are hydrolysis products of epichlorohydrin. These compounds are suspected carcinogens and contribute to environmental pollution during the paper making process.

A variety of references describe the removal of organohalogen compounds from water by use of various adsorbents including ion exchange resins, polymeric adsorbents, silica, alumina, clays, activated carbons, zeolites, etc. See, for example, K. Dorfner, *Ion Exchangers, Properties and Applications*. (Ann Arbor Science Publishers Inc., 1972, Ann Arbor);

*Ion Exchangers*, K. Dorfner, Ed. (Walter de Gruyter, NY, 1991);

Amberlite® Product and Technical Bulletin, for Amberlite® IRA-93 ion exchange resin, Rohm and Haas Co., 1981.

SUMMARY OF THE INVENTION

The present invention is a process for lowering the amount of epichlorohydriii and related hydrolysis compounds that are contained in an aqueous solution of polyamide-epichlorohydrin resin, which comprises adsorbing epiclilorolhydrin and related hydrolysis compounds contained in an aqueous solution of polyamide-epichlorohydrin resin by contacting the aqueous solution with an adsorbent selected from the group consisting of ion exchange resins, activated carbon, zeolites, silica, clays, and alumina.

The present invention also is a process for increasing the strength of paper and lowering the amount of epichlorohydrin and related hydrolysis compounds in paper containing polyamide-epichlorohydrin strength-enhancing resin, which comprises adsorbing epichlorohydrin and related hydrolysis compounds contained in an aqueous solution of polyamide-epiclilorohydrin resin by contacting the aqueous solution with an adsorbent selected from the group consisting of ion exchange resins, non-ionic polymeric resins, synthetic carbonaceous adsorbents, activated carbon, zeolites, silica, clays, and alumina, and then using the resulting solution as an additive in the manufacture of paper products. The resulting solution may be added to pulp as it is being fabricated into paper, or the resulting solution may be used to impregnate paper that has already been fabricated.

DETAILED DESCRIPTION

The process for forming the starting material for the present invention, i.e., the aqueous solution of polyamide-epichlorohydrin, is well-known and is described in Keim U.S. Pat. No. 2,926,154. As pointed out in this patent the polyamide portion of the resin is the reaction product of a polyalkylene polyamide having two primary amine groups and at least one secondary amine group with a saturated aliphatic dicarboxylic acid. Suitable polyamines include polyethylene polyamine, polypropylene polyamine, polybutylene polyamine, etc. Suitable saturated dicarboxylic aliphatic acids are preferably those containing 3 to 6 carbon atoms, for example, malonic, succinic, glutaric and adipic.

The Keim patent also teaches reaction conditions and the preferred concentration of ingredients.

In the examples below Cascamid® C-12, a polyamide-epiclilorohydrin resin produced by Borden Inc., was the wet strength resin treated.

The levels of epichlorohydrin, dichloropropanol and chloropropanediol were measured by capillary gas chromatography using calibrated standards.

The wet and dry strength of paper was measured on unbleached kraft paper that had been treated with an aqueous solution of 0.1% resin which was applied by a size press. 4 inch by 1 inch strips of treated paper were re-wetted in distilled water by soaking for 1 hr., lightly blotted to remove excess water and then tested in a tensile strength instrument. Wet strength is reported in pounds required to break the test sample per inch of sample width. Dry strength is similarly measured for treated sample which has not been re-wetted. Wet-to-dry strength ratio is reported as percent.

The adsorbent beds are prepared by slurrying the adsorbent with deionized water, transferring the slurry to a column containing deionized water, and allowing the water to slowly drain from the column until the top surface of the bed is just covered with water and a packed bed free of entrained air created. The bed is further backwashed with deionized water to remove air bubbles and to classify the adsorbent particles within the bed. Basic ion exchange resin particles are previously washed with sodium hydroxide followed by washing with deionized water to insure that resin particles are in the desired hydroxide form. Adsorbents such as activated carbon with contain extremely fine particles should be repeatedly decanted at the aqueous slurry stage to remove such fine particles which can cause plugging of the bed. Adsorbents beds can be regenerated by using a wash appropriate to the adsorbent which removes adsorbed epichlorohydrin and hydrolysis products. The polyamide-epichlorohydrin solution can be fed to the bed by gravity or by a pump. The polyamide-epichlorohydrin solution can be contacted with the adsorbent at temperatures from about 0 degrees C. to about 50 degrees C. (Lower temperatures limit the solution pumpability and higher temperatures cause undesirable loss of polyamide-epichlorohydrin resin properties.) Pumping pressures are limited by the particular adsorbent selected by the physical limitations of the pump and column construction. Bed size is very highly dependent on the particular specific adsorption capacity of the adsorbent bed, the level of epichlorohydrin and its hydrolysis products in the solution being treated polyamide-epichlorohydrin solution, and the level of epichlorolhydrin and its hydrolysis products desired in the treated, effluent polyamide-epichlorohydrin solution.

Pumping flow rates for the polyamide-epichlorohydrin solution are dependent on the specific adsorbent chosen but typically range from 1 to 40 bed volumes/hour.

Alternatively, the polyamide-epichlorohydrin solutions can be mixed with the slurry of adsorbent, stirred to insure through contact with the adsorbent, and then the solution of treated polyamide-epichlorohydrin is separated from the adsorbent by filtration or decantation.

Adsorbents are selected from the group consisting of ion-exchange resins, non-ionic polymeric resin, synthetic carbonaceous adsorbents, activated carbon, zeolites, silica, clays, and alumina. Preferred adsorbents are selected from the group consisting of weakly basic ion exchange reins, non-ionic macroporous polymeric resins, and synthetic carbonaceous adsorbents. Most preferred adsorbents are selected from the group consisting of synthetics carbonaceous adsorbents.

Examples of such adsorbents include: Amberlite® IRA 93, a weakly basic macroporous, macroreticular resin; Amberlyst® A-21, a weakly basic macroreticular resin; Amberlite® XAD-2. -4, -7, -16, a family of non-ionic macroporous polymeric resins; Ambersorb® 563 and 572, a family of synthetic carbonaceous resins; Darco® 4-12 mesh granular activated carbon; Norit® ROO.8 pelletized activated carbon; 13X molecular sieve (⅛" pellet); 5 Angstrom molecular sieve (⅛" pellet); 100–200 mesh silica; neutral alumina; basic alumina; Montmorillonite, K10 and KSF, layered clays.

EXAMPLES

Example 1

100 grams of Amberlite® IRA-93 resin was slurried with 200 ml of deionized water and periodically stirred for 1 hr. The water was decanted and the resin stirred with 200 me of 1 Normal HCl which was then decanted. The resin was slurried with 200 ml of water, decanted; slurried with 200 ml of 0.5 Normal NaOH, decanted; slurried with 200 ml water decanted; and the entire cycle repeated. The resin was slurried and loaded to a chromatography column with a glass frit in the bottom and a stopcock. Approximately 150 ml of Cascamid® C-12 was passed through the bed. The Cascamid® contained about 5.2 ppm of epiclilorohydrin, about 10,200 ppm of dichloropropanol and 105 ppm of chloropropanediol. A treated sample contained less than 1 ppm of epichlorohydrin, less than 2 ppm of dichloropropanol and about 15.5 ppm of chloropropanediol.

Kraft paper was treated with the sample. The treated paper had a wet strength of 13.0 lb./in, a dry strength of 46.5 lb./in and a wet/dry ratio of 27.9%. A sample of kraft paper treated with the untreated Cascamid® C-12 had a wet strength of 12.5 lb./in, dry strength of 45.3 lb./in, and a wet dry ratio of 27.6%.

Example 2

A resin bed was prepared as described in Example 1 using Amberlyst® A-21.

A sample of Cascamid® containing about 7.8 ppm of epichlorohydrin, about 10,800 ppm of dichloropropanol and 114 ppm of chloropropanediol was treated with this bed. A treated sample contained less than 1 ppm of epichlorohydrin, less than 2 ppm of dichloropropanol and about 4.5 ppm of chloropropanediol. Paper treated with the untreated Cascamid® had a wet strength of 12.8 lb./in, a dry strength of 42.1 lb./in, and a wet/dry ratio of 30.4%. Paper treated with the treated sample of Cascamid® had a wet strength of 15.5 lb./in, a dry strength of 45.3 lb./in and a wet/dry ratio of 34.2%.

Example 3

A slurry was prepared from 90 g (dry weight) Ambersorb® 563 and 150 ml methanol, was stirred for 30 minutes until the adsorbent sank to the bottom of the mixture and was then loaded to a 1 inch diameter glass column. Excess methanol was drained and the bed was washed with 10 bed volumes of deionized water to remove methanol. The bed was further treated by water backwashing with 100% bed expansion for 30 minutes at 30 ml/minute. Bed volume was approximately 150 ml.

A 12.5% aqueous solution of polyamide paper resin, Cascamid® C-12 containing a total of 6946 ppm of epichlorohydrin, dichioropropanol and chioropropanediol was then passed through the bed at 10 ml/minute by a peristaltic pump. Fractions were collected at 100 ml intervals and analyzed for total epichlorohydrin, dichloropropanol, and chloropropanediol.

| FRACTION, ml | TOTAL, ppm |
| --- | --- |
| 100 | <5 |
| 200 | <5 |
| 300 | <5 |
| 400 | <5 |
| 500 | <5 |
| 600 | <5 |
| 700 | <5 |
| 800 | <5 |
| 900 | <5 |
| 1000 | <5 |
| 1100 | 12 |
| 1200 | 55 |
| 1300 | 240 |
| 1400 | 616 |
| 1500 | 1547 |
| 1600 | 2568 |

What is claimed is:

1. A process for lowering the amount of epichlorohydrin and related hydrolysis compounds that are contained in an aqueous solution of polyamide-epichlorohydrin resin, which comprises adsorbing epichlorohydrin and related hydrolysis compounds contained in an aqueous solution of polyamide-epiclilorohydrin resin by contacting the aqueous solution with an adsorbent selected from the group consisting of ion exchange resins other than polymeric basic ion exchange resins, non-ionic polymeric resins, synthetic carbonaceous adsorbents, activated carbon, zeolites, silica, clays, and alumina.

* * * * *